Jan. 30, 1934.   C. V. NOYES   1,945,068

FISHLINE GUIDE

Filed July 15, 1929

Charles V. Noyes, Inventor

By Slough and Canfield
Attorneys

Patented Jan. 30, 1934

1,945,068

UNITED STATES PATENT OFFICE 1,945,068

FISHLINE GUIDE

Charles V. Noyes, Geneva, Ohio, assignor to The American Fork & Hoe Company, Cleveland, Ohio, a corporation of Ohio Application July 15, 1929. Serial No. 378,248

3 Claims. (Cl. 43—24)

My invention relates to line guides for fishing line rods and relates particularly to line guides commonly known as tip tops adapted to be carried on the tip ends of fishing rods and particularly slender metallic tip ends therefor.

An object of my invention is to provide line guides of the tip top class adapted to be rigidly secured on the solid slender metallic tip ends of fishing rods and which will not introduce an inherent weakness susceptible to breakage to the rod.

Another object of my invention is to provide an improved connection between tip tops and slender metallic fishing rod tips which will securely unite the tip top, which includes a fish line guide, to the tip end of the fishing rod in a highly efficient, inexpensive and durable manner.

Other objects of my invention and the invention itself will become apparent by reference to the following description of an embodiment of my invention and to the accompanying drawing illustrating the said embodiment.

Referring to the drawing.

Figure 1:
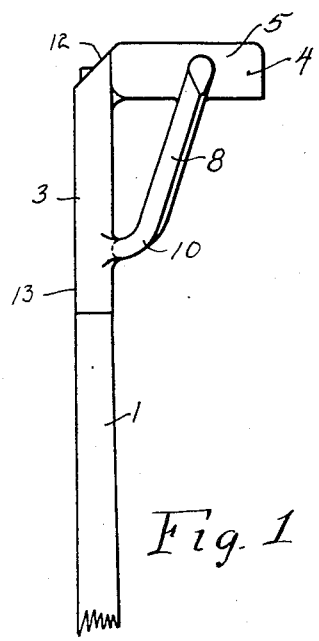
Fig. 1 is a side plan view of a fishing rod tip end embodying the principles of my invention.
Figure 2:
Fig. 2 is a similar view of the tip end of the rod prior to the addition of the tip top line guide element thereto.
Figure 3:
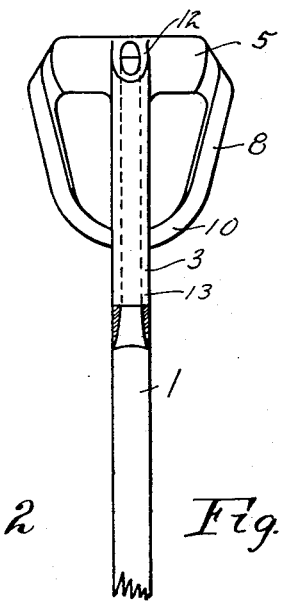
Fig. 3 is a rear plan view of the rod with attached tip top guide element, the extreme end of the rod tip being telescoped within a portion of the guide element and indicated by dotted lines.

Referring now to all of the figures of drawing in all of which like parts are designated by like reference characters the tip of the fishing rod is shown at 1 and is preferably ground or otherwise reduced at its extreme tip 2, to give it a rounded outer surface to telescope tightly within a tubular sleeve 3. The surface of the reduced portion 2 is thus made bright and is given an outer surface coating of solder, by a so-called "tinning" operation. In all the figures, the tip is illustrated as lying in a horizontal position.

Figure 4:
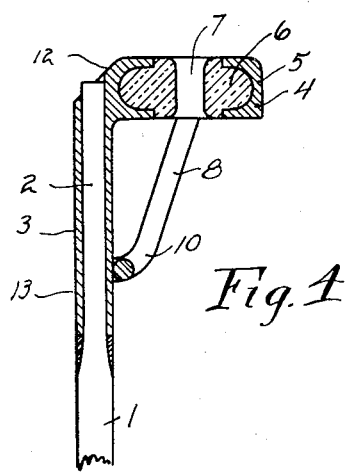
Fig. 4 is a view similar to Fig. 1 showing the parts thereof in longitudinal medial section.

The tip top proper comprises an annular line guide 4, comprising an inwardly channeled metallic annulus and a stone or other non-frictional line guiding annulus 6 securely held within the inturned flanges of the metallic annulus. Both of the annuli are shown in longitudinal medial sectional view in Figure 4.

The line guiding annulus 6 is provided with a line receiving bore 7 in accordance with the usual practice. A wire loop 8 is rigidly affixed by its ends to opposite sides of the metallic annulus 5, preferably by being soldered thereto, and its mid portion 10 is upwardly bowed to the level of the circumferential portion of the annulus 5, the upper surfaces of said annulus and the mid-portion of the loop being approximately in horizontal alignment when the annulus 5 is placed vertically as shown.

A tubular sleeve 3 is then placed transversely of the annulus 5 and the mid-portion 10 of the loop 8, and soldered thereto, said sleeve preferably having its forward end edge 12 cut angularly and having a portion 13 projecting rearwardly from the mid portion of the loop 10 to which it has been soldered. The sleeve 3 preferably has its inner walls "tinned", that is coated with solder, preferably prior to attachment of the sleeve to the annulus and wire loop.

The line guide carrying annulus, the loop, and the sleeve, as described, form a triangularly braced structure, the members of which form struts to restrain the effect of the collapsing effect thereupon of laterally directed forces incidental to the use of the tip top guide element on a rod.

The "tinned" reduced end of the rod tip 1 is then projected into the rearwardly extending end of the sleeve and through the sleeve until it projects slightly from the angularly cut forward edge of the sleeve, and the sleeve is then heated to flow the solder coating on its interior walls with the like solder coating of the reduced end of the tip, to solder all interior portions of the sleeve on to the tip. This is accomplished while the loop and metallic annulus are carefully held on to the sleeve and precautions taken to avoid unsoldering of the sleeve therefrom.

If preferred, the loop and annulus may be soldered on to the sleeve after it has become affixed to the tip end of the rod, but I prefer the former procedure, as described.

The structure described is found to be very strong as compared with prior constructions; breakage of the parts is reduced to a minimum, although such breakage frequently occurs in prior constructions.

All portions of the sleeve are supported by an interior steel rod portion telescoped therein and the line guide is practically pendant by truss-like arms extending from two longitudinally spaced portions of the steel rod tip surrounded as it is by the sleeve telescoped thereon.

Having thus described my invention in a specific embodiment, I am aware that numerous and extensive departures may be made from the embodiment herein illustrated and described, but without departing from the spirit of my invention.

I claim:

1. In a tip top line guide for fishing rods of the type terminating in a slender steel tip, a sleeve open at both ends to be rigidly telescoped over the rod tip and affixed thereon, a line guide element having a metallic annular portion affixed directly to the tip end of the sleeve and supported transversely pendant therefrom, and a wire loop integrally uniting lateral portions of the annular guide portion and a portion of the sleeve spaced from its said tip end.

2. In a tip top line guide for fishing rods of the type terminating in a slender steel tip, a sleeve to be rigidly telescoped over the rod tip and affixed thereon, a line guide element having a metallic annular portion affixed directly to the tip end of the sleeve and supported transversely pendant therefrom with portions of the annular portion overlapping the end of the rod tip, and metallic struts integrally uniting the lateral portions of said annular guide portion with a portion of the sleeve longitudinally spaced rearwardly from its tip.

3. In a tip top line guide for the tips of fishing rods, a tubular sleeve to be rigidly telescoped on to the extreme tip end of a fishing rod and affixed thereto, said rod projected substantially therethrough, a line guide rigidly secured to the tip end of the sleeve and pendant therefrom, and a pair of struts rigidly joining lateral portions of the guide spaced from the tip end of the sleeve, with a portion of the sleeve spaced substantially rearwardly from its said tip end.

CHAS. V. NOYES.